United States Patent Office 2,728,000
Patented Dec. 20, 1955

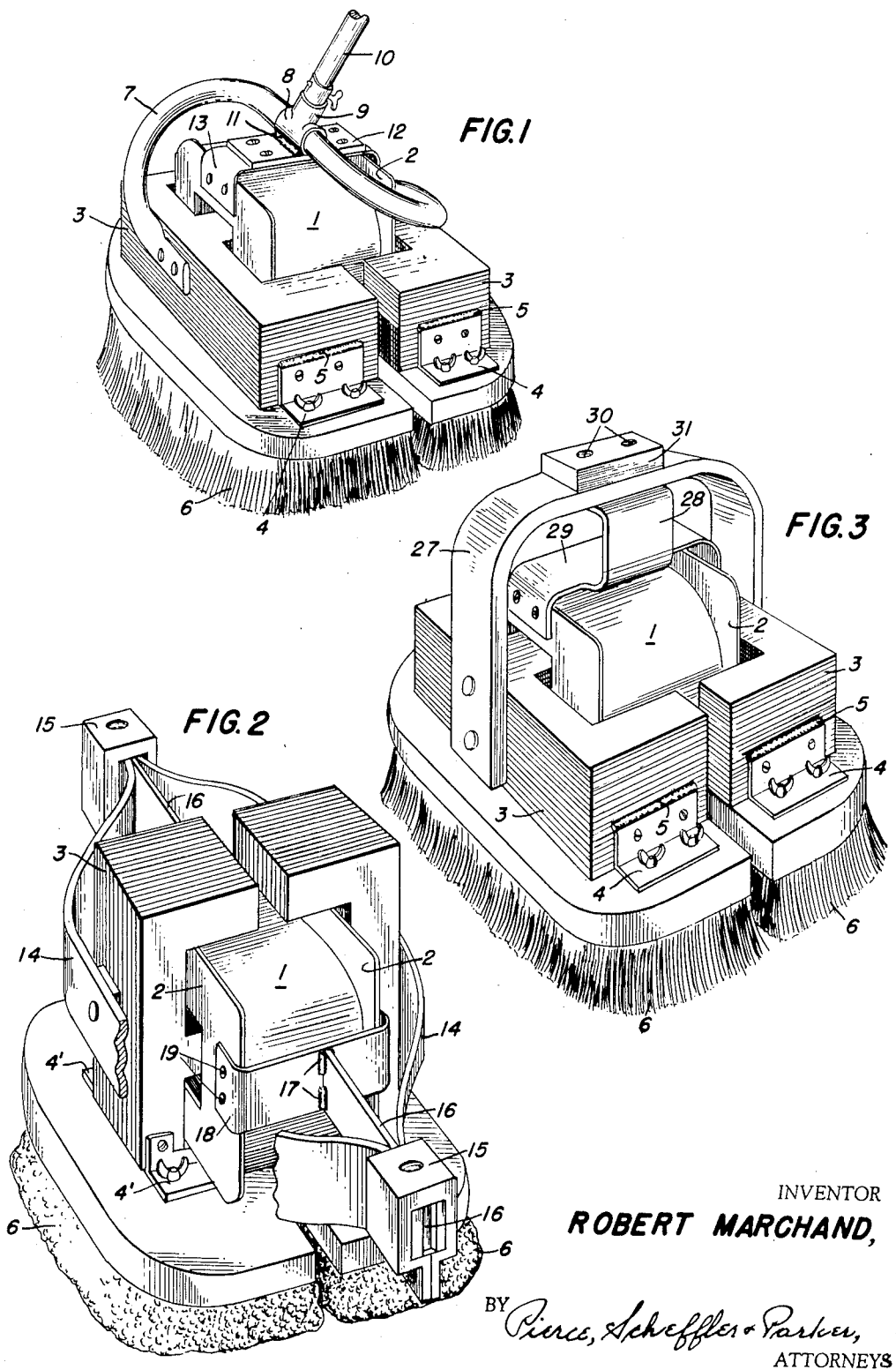

2,728,000

VIBRATORY ELECTROMAGNETIC MOTOR

Robert Marchand, Paris, France, assignor to Compagnie Electro-Mecanique, Paris, France, a body corporate of France Application July 1, 1954, Serial No. 440,787
Claims priority, application France July 6, 1953
5 Claims. (Cl. 310—29)

This invention relates to a vibratory electromagnetic motor and more particularly to a vibratory motor adapted for use in the finishing and care of floors of wood or stone.

Objects of the invention are to provide electromagnetic motors of economical construction having two armatures of equal mass which move in opposite directions and thereby balance the forces developed by motor winding, whereby no vibration is transmitted to a handle or base to which the motor winding is secured. An object is to provide an electromagnetic motor having a single energizing coil and two E-shaped armatures to which different types of work devices, such as sanders, mops, brushes, waxing pads or the like, may be attached.

These and other objects and the advantages of the invention will be apparent from the following specification when taken with the accompanying drawings in which:

Fig. 1 is a perspective view of an electromagnetic motor embodying the invention;

Fig. 2 is a perspective view, with a part broken away, of another embodiment of the invention; and Fig. 3 is a perspective view of a further embodiment.

In Fig. 1 of the drawings, the reference numeral 1 identifies an energizing coil or winding of an electromagnetic motor; the coil being on a spool or winding form having end flanges 2 which are preferably non-metallic. An E-shaped armature 3 of conventional laminated sheet iron construction is arranged at each end of coil 1, the central legs of the armatures extending into the hollow center of the coil and the end legs partially embracing the sides of the coil. The armatures are of equal mass and their legs are of such lengths as to provide air gaps between the armatures which permit free vibration of the same on energization of the coil 1 by an alternating current.

Brackets 4 are rigidly secured to the respective armatures by screws and/or weld metal 5 for the detachable connection of appropriate work devices, such as the illustrated brushes or polishing pads 6, to the armatures.

The ends of a spiral spring 7 are secured to the armatures 3 to support and guide them in their vibratory motion, the spring being of such stiffness as to resonate mechanically therewith when the winding 1 is energized by an alternating current, the resonant frequency preferably being twice that of the supply current. The center and non-vibrating part of the spring 7 extends through the head 8 of a hollow T having a stem 9 to which a handle 10 is secured. Weld metal 11 anchors the T to a plate 12 which reinforces or may be an integral part of an inverted U-shaped bracket 13 which spans and is secured to the flange 2 of the spool carrying the winding 1.

The usual flexible electric conductor, not shown, for energizing the winding 1 may be supported by the handle 10 and if desired a cover for the machine may be mounted on the plate 12.

In the embodiment shown in Fig. 2, the E-shaped armatures 3 are vertically arranged and are secured to the centers of a pair of arcuate leaf springs 14 whose ends are anchored in clamps 15. Bars 16 are positioned in the clamps 15 between the springs 14 and are secured by weld metal 17 to yokes 18 which, in turn, are rigidly secured to the flanges 2 of the winding spool by screws 19. In this form of the invention, the ends of the springs 14 do not vibrate and a handle, not shown, may be attached to the clamps 15.

The construction preferably is similar to that shown and described with reference to Fig. 1 except that the brackets 4' for the attachment of devices such as pads 6 must be designed to clear the spool flanges 2.

The embodiment shown in Fig. 3 differs from the Fig. 1 construction in that the spring 27 for guiding the vibratory movements of the armatures 3 is of inverted U-shape with its central non-vibrating portion secured to a strap 28 integral with a yoke 29 which has its ends secured to the flanges 2 of the spool carrying the winding 1. The strap 28 may be secured to the spring 27 by rivets 30 which also anchor to the spring a block 31 to which a handle, not shown, may be attached.

While the presently preferred constructions for a vibratory electromagnetic motor have been illustrated and described, it is to be understood that the motor may be employed for other purposes and that various modifications in the construction and arrangement of the component parts fall within the spirit and scope of the invention as set forth in the following claims.

I claim:

1. In an electric motor driven floor working machine the combination comprising, a hollow coil adapted to be energized by an alternating current, a pair of mutually confronting laminated rigid E-shaped armatures of equal mass, said armatures constituting the entire magnetic circuit, the central leg of each said armature extending into the hollow in said coil and the end legs of each said armature partially embracing the sides of said coil, said armatures being movable in a vibratory manner rectilinearly in opposite directions parallel with the axis of said coil, separate work devices secured respectively to like directed faces of said armatures, spring means having portions secured to the mid portions of the respective armatures for supporting said armatures and tuning the same to mechanical resonance upon energization of said coil with alternating current, said spring means having a non-vibrating portion remote from the portions thereof secured to said armatures, connecting means rigidly uniting said non-vibrating portion of said spring means with said coil, and a handle secured to a non-vibrating part of said machine.

2. An electric motor driven floor working machine as defined in claim 1 wherein said coil comprises a winding on a flanged spool, and said connecting means unites said non-vibratory portion of said spring means and the flanges of said winding spool.

3. An electric motor driven floor working machine as defined in claim 1 wherein said spring means comprises a spiral spring having the end portions thereof secured to the respective armatures.

4. An electric motor driven floor working machine as defined in claim 1 wherein said spring means comprises a pair of leaf springs with the central portions thereof secured to the respective armatures.

5. An electric motor driven floor working machine as defined in claim 1 wherein said spring means comprises a spring of U-form having the ends thereof secured to the respective armatures.

References Cited in the file of this patent

UNITED STATES PATENTS

| 694,778 | Perret | Mar. 4, 1902 |
| 2,245,981 | Knopp | June 17, 1941 |

FOREIGN PATENTS

| 467,821 | Italy | Dec. 22, 1951 |